United States Patent
Oe et al.

(10) Patent No.: US 7,641,821 B2
(45) Date of Patent: Jan. 5, 2010

(54) PROCESS OF MANUFACTURING OPTICAL WAVEGUIDE AND CONNECTION STRUCTURE OF OPTICAL DEVICES

(75) Inventors: Kunishige Oe, Kyoto (JP); Kenichi Yamashita, Kyoto (JP); Kazunori Mune, Osaka (JP); Amane Mochizuki, Osaka (JP); Ryuusuke Naitou, Osaka (JP)

(73) Assignee: Nitto Denko Corporation, Osaka (JP)

( * ) Notice: Subject to any disclaimer, the term of this patent is extended or adjusted under 35 U.S.C. 154(b) by 1059 days.

(21) Appl. No.: 10/760,389

(22) Filed: Jan. 21, 2004

(65) Prior Publication Data

US 2004/0178522 A1    Sep. 16, 2004

(30) Foreign Application Priority Data

Jan. 24, 2003    (JP)    ............ P. 2003-015533

(51) Int. Cl.
  *B29D 11/00*    (2006.01)
(52) U.S. Cl. .................... 264/1.25; 264/1.27
(58) Field of Classification Search ........... 250/908; 264/1.24, 1.25, 248, 1.27, 1.37; 331/84; 385/50, 5, 130; 333/113; 257/E51.028, E51.033; 430/290; 65/385, 406; 438/31
See application file for complete search history.

(56) References Cited

U.S. PATENT DOCUMENTS

| | | | | |
|---|---|---|---|---|
| 3,809,732 A | * | 5/1974 | Chandross et al. | .......... 430/321 |
| 5,053,314 A | * | 10/1991 | Yamaoka et al. | ......... 430/270.1 |
| 5,665,523 A | * | 9/1997 | Omote et al. | ............. 430/282.1 |
| 5,854,868 A | * | 12/1998 | Yoshimura et al. | ............ 385/50 |
| 5,902,715 A | | 5/1999 | Tsukamoto et al. | |
| 6,017,681 A | | 1/2000 | Tsukamoto et al. | |
| 6,048,663 A | * | 4/2000 | Fujii et al. | ............... 430/270.1 |
| 6,081,632 A | | 6/2000 | Yoshimura et al. | |
| 6,300,037 B1 | * | 10/2001 | Fujii et al. | ............... 430/270.1 |
| 6,591,491 B2 | * | 7/2003 | Fujii et al. | ..................... 29/830 |
| 6,607,865 B2 | * | 8/2003 | Makabe et al. | .............. 430/191 |
| 6,654,535 B2 | * | 11/2003 | Teramoto et al. | ............ 385/132 |
| 6,671,438 B2 | * | 12/2003 | Ido et al. | ...................... 385/49 |

FOREIGN PATENT DOCUMENTS

| | | |
|---|---|---|
| JP | 60-173508 | 9/1985 |
| JP | 07-077637 | 3/1995 |
| JP | 08-340422 A | 12/1996 |
| JP | 09-061675 | 3/1997 |
| JP | 11-072649 | 3/1999 |
| JP | 2000-347043 A | 12/2000 |
| JP | 2002-356615 | 12/2002 |
| JP | 2002 356615 A | 12/2002 |

* cited by examiner

*Primary Examiner*—Mathieu D Vargot
(74) *Attorney, Agent, or Firm*—Sughrue Mion, PLLC

(57) ABSTRACT

The invention provides a process of manufacturing an optical waveguide for optically connecting a plurality of optical devices, comprising the steps of: disposing a resin composition between two or more optical devices, the resin composition comprising a resin and a 1,4-dihydropyridine derivative, forming an optical path through the resin composition between the optical devices by light having a wavelength capable of inducing a structural change in the 1,4-dihydropyridine derivative, and removing the 1,4-dihydropyridine derivative from the resulting resin composition. Also disclosed is a connection structure obtained by the process.

10 Claims, 5 Drawing Sheets

PROCESS OF MANUFACTURING OPTICAL WAVEGUIDE AND CONNECTION STRUCTURE OF OPTICAL DEVICES

FIELD OF THE INVENTION

This invention relates to a process of manufacturing an optical waveguide and a connection structure of optical devices. More particularly, the invention relates to a process of forming an optical waveguide for optically connecting two or more optical devices and to a structure in which optical devices are optically connected via the optical waveguide.

BACKGROUND OF THE INVENTION

As a method for optically connecting a plurality of optical devices, it has been known a process comprising the steps of disposing a substance which changes in refractive index when irradiated with a certain range of wavelengths of light (hereinafter referred to as "optical refractive index material") in part or the whole of the space between optical devices and irradiating the optical refractive index material with light of wavelength causing the material to change its refractive index from at least one of the optical devices, or disposing a photosensitive material in part or the whole of the space between optical devices and irradiating the photosensitive material with light of wavelength causing the material to change its refractive index and insolubilizing the material from at least one of the optical devices, thereby to induce self-focusing to form a waveguide or an optical coupling between the optical devices (see, for example, Patent Document 1).

Patent Document 1: JP 8-320422 A

In order for the optical refractive index material to self-form an optical guide or an optical coupling in the process disclosed in Patent Document 1, the optical refractive index material must increase its refractive index in the irradiated part over the non-irradiated part. To achieve this, it is required that the kinds and the compounding ratio of components used to make the optical refractive index material, such as a high- or low-refractive monomer, a sensitizer, a polymerization initiator, etc., be selected strictly. Such selection of the formulation is very troublesome.

In case where the photosensitive material is used for self-formation of an optical guide or an optical coupling, insolubilization of part of the photosensitive material should be followed by developing processing. Therefore, the process involves technical restrictions and an increased number of steps for development. Thus, also in this case, the process needs very troublesome task.

SUMMARY OF THE INVENTION

In the light of the above-mentioned disadvantages, an object of the present invention is to provide a process of manufacturing an optical waveguide for connecting optical devices using a simpler formulation through a reduced number of steps.

Another object of the invention is to provide a structure in which optical devices are connected through an optical waveguide formed by the process.

Other objects and effects of the invention will become apparent from the following description.

The above-described objects of the invention have been achieved by providing a process of manufacturing an optical waveguide for optically connecting a plurality of optical devices, comprising the steps of:

disposing a resin composition between two or more optical devices, the resin composition comprising a resin and a 1,4-dihydropyridine derivative, forming an optical path through the resin composition between the optical devices by light having a wavelength capable of inducing a structural change in the 1,4-dihydropyridine derivative, and removing the 1,4-dihydropyridine derivative from the resulting resin composition.

In a preferred embodiment of the process, the resin comprises at least one member selected from the group consisting of polyamic acid, polyimide and polyamide-imide.

In another preferred embodiment, the resin composition contains 0.1 to 30 parts by weight of the 1,4-dihydropyridine derivative per 100 parts by weight of the resin.

The present invention also relates to a connection structure of optical devices comprising:

two or more optical devices; and at least one optical waveguide optically connecting the optical devices, the optical waveguide being formed by a process according to any one of claims 1 to 3.

BRIEF DESCRIPTION OF THE DRAWINGS

FIGS. 1A to 1D constitute a process chart for producing an optical waveguide according to an embodiment of the present invention, in which:

FIG. 1A shows the step of aligning a first optical device and a second optical device to be optically connected along the optical path direction with a prescribed spacing therebetween;

FIG. 1B shows the step of disposing a resin composition for optical connection between the first and the second optical devices;

FIG. 1C shows the step of guiding light from the output end of the first optical device to the input end of the second optical device via the resin composition; and FIG. 1D shows the step of removing a 1,4-dihydropyridine derivative to form an optical waveguide, wherein the part of the resin composition where an optical path has been formed functions as a core with a higher refractive index, and the other part serves as a clad with a lower refractive index.

FIGS. 2A to 2C constitute a chart showing mechanical alignment of optical devices with the aid of a V-grooved substrate, in which:

FIG. 2A shows the step of preparing the V-grooved substrate;

FIG. 2B is the step of placing a first optical device and a second optical device in the groove of the V-grooved substrate with a prescribed spacing therebetween, and FIG. 2C shows the step of dropping a resin solution for optical connection in the spacing.

FIGS. 3A to 3C illustrate the step of forming an optical path through a resin composition for optical connection between the optical devices, in which:

FIG. 3A shows the state where the light enters the resin composition;

FIG. 3B shows the state where the light is propagating in the resin composition; and FIG. 3C shows the state where the light has propagated through the resin composition.

FIGS. 4A to 4D represent other embodiments of the step of forming an optical path through a resin composition for optical connection between optical devices, in which:

FIG. 4A shows the step of leading light from the output end of a second optical device, via a resin composition for optical connection, to the input end of the first optical device;

FIG. 4B shows the step in which light emitted from the output end of the first optical device and light emitted from the output end of the second optical devices are connected in the resin composition;

FIG. 4C shows the step in which light emitted from the output end of the first optical device is reflected on a mirror in the resin composition and made incident on the input end of the second optical device; and FIG. 4D shows the step in which light emitted from the output end of the first optical device and light emitted from the output end of the second optical device are reflected on a mirror in the resin composition to form a bent optical path connection.

DETAILED DESCRIPTION OF THE INVENTION

Figure 1A:
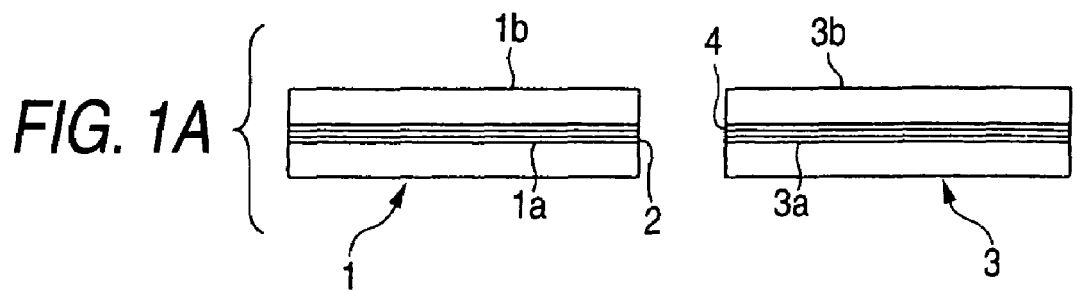

In the first step of the process according to the invention, a resin composition for optical connection comprising a resin and a 1,4-dihydropyridine derivative is disposed between optical devices.

The first step begins with preparation of a resin composition comprising a 1,4-dihydropyridine derivative and a resin.

The 1,4-dihydropyridine derivative includes compounds represented by formula (I):

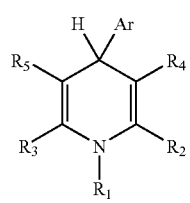

(I)

wherein Ar represents an aromatic group having a nitro group at the ortho position with respect to the bond to the 1,4-dihydropyridine ring; $R_1$ represents —H, —$CH_3$, —$(CH_2)_nCH_3$, —$CF_3$, —$(CF_2)_nCF_3$, —$C_6H_5$, —$(CH_2)_nC_6H_5$, —$CH_2CH=CH_2$, —OH, —$OCH_3$, —$O(CH_2)_nCH_3$, —$OCF_3$, —$O(CF_2)CF_3$, —$OC_6H_5$, —$O(CH_2)_nC_6H_5$, —COOH, —$COOCH_3$, —$COO(CH_2)_nCH_3$, —$COCH_3$, —$CO(CH_2)_nCH_3$— $(CH_2)_nOH$, —$(CH_2)_nCOOH$, —$NO_x$, —F, —Cl, —Br or —I; $R_2$ and $R_3$, which may be the same or different, each represent —H, —$CH_3$, —$(CH_2)_nCH_3$, —$CF_3$, —$(CF_2)_nCF_3$, —OH, —$OCH_3$, —$O(CH_2)_nCH_3$, —$OCF_3$, —$O(CF_2)_nCF_3$, —$COOCH_3$, —$COO(CH_2)_nCH_3$, —$COCH_3$, —$CO(CH_2)_nCH_3$, —$(CH_2)_nOH$, —$(CH_2)_nCOOH$, —$NO_x$, —F, —Cl, —Br or —I; $R_4$ and $R_5$, which may be the same or different, each represent —H, —CN, —$COOR_z$, —$COR_z$ or —$CONHR_z$; n represents an integer of 1 to 4; and $R_z$ represents a hydrogen atom or an alkyl group having 1 to 6 carbon atoms.

The aromatic group Ar having a nitro group at the ortho position with respect to the bond to the 1,4-dihydropyridine ring is preferably a 2-nitrophenyl group. $R_1$ is preferably —H, —$CH_3$ or —$(CH_2)_nCH_3$ (n is an integer of 1 to 4). $R_2$ and $R_3$ each preferably include —H, —$CH_3$, and —$(CH_2)_nCH_3$ (n is an integer of 1 to 4). $R_4$ and $R_5$ each preferably include —$COOR_z$ and —$COR_z$ ($R_z$ is a hydrogen atom or an alkyl group having 1 to 6 carbon atoms).

Specific examples of the 1,4-dihydropyridine derivatives represented by formula (I) include 1-ethyl-3,5-dimethoxycarbonyl-4-(2-nitrophenyl)-1,4-dihydropyridine, 1-methyl-3,5-dimethoxycarbonyl-4-(2-nitrophenyl)-1,4-dihydropyridine, 1-propyl-3,5-dimethoxycarbonyl-4-(2-nitrophenyl)-1,4-dihydropyridine, 1-propyl-3,5-diethoxycarbonyl-4-(2-nitrophenyl)-1,4-dihydropyridine, 2,6-dimethyl-3,5-dimethoxycarbonyl-4-(2-nitrophenyl)-1,4-dihydropyridine (nifedipin), 2,6-dimethyl-3,5-diacetyl-4-(2-nitrophenyl)-1,4-dihydropyridine (acetyl form), and 1-ethyl-2,6-dimethyl-3,5-diacetyl-4-(2-nitrophenyl)-1,4-dihydropyridine.

These 1,4-dihydropyridine derivatives can be used either singly or as a mixture of two or more thereof. Preferred of the 1,4-dihydropyridine derivatives are those which are inexpensive and show only a small absorption ascribed to the C—H bond stretch vibration in the near infrared region (useful as communication wavelengths), such as 1-ethyl-3,5-dimethoxycarbonyl-4-(2-nitrophenyl)-1,4-dihydropyridine. Further, in the case where the distance between glass fibers to be optically connected is long, for example, 1,000 μm or longer (preferably from 1,000 to 3,000 μm), 2,6-dimethyl-3,5-diacetyl-4-(2-nitrophenyl)-1,4-dihydropyridine (acetyl form), and 1-ethyl-2,6-dimethyl-3,5-diacetyl-4-(2-nitrophenyl)-1,4-dihydropyridine are preferred for reducing the connection loss.

The 1,4-dihydropyridine derivative can be prepared, for example, by allowing a substituted benzaldehyde, double the molar quantity of an alkyl propionate (alkyl propargylate), and a corresponding primary amine to react in glacial acetic acid under reflux (see *Khim Geterotsikl. Soed.*, 1982, 1067-1071).

The resin for use in the resin composition is not particularly limited as long as it serves as a matrix capable of uniformly dissolving or dispersing the 1,4-dihydropyridine derivative. Examples of suitable resins include polyamic acid, polyimide, polyamide-imide, polycarbonate, polymethacrylates (e.g., polymethyl methacrylate), polyester (e.g., polyethylene terephthalate), polyether sulfone, polynorbornene, epoxy resins, polyaryl, polycarbodiimide, polyether imide, polyester imide, styrene resins (e.g., polystyrene, acrylonitrile-styrene copolymers, and acrylonitrile-butadiene-styrene copolymers), polyarylene ethers (e.g., polyphenylene ether), polyallylate, polyacetal, polyphenylene sulfide, polysulfone, polyether ketones (e.g., polyether ether ketone and polyether ketone ketone), polyvinyl alcohol, polyvinylpyrrolidone, fluorine resins (e.g., polyvinylidene fluoride resins, hexafluoropropylene resins, and hexafluoroacetone resins), and polysilane resins (including polyalkylsilanes (e.g., polymethylsilane), polyalkylcycloalkylsilanes (e.g., polymethylcyclohexylsilane), polyalkylarylsilanes (e.g., polymethylphenylsilane), and polyarylarylsilanes (e.g., polydiphenylsilane).

From the standpoint of heat resistance, preferred of them are polyamic acid, polyimide, polyamide-imide, polyether imide, polyether ketones, epoxy resins, polycarbodiimide, fluorine resins, and polysilane resins.

From the viewpoint of transparency, preferred are the above-described resins further having a halogen atom (e.g., fluorine) introduced therein, such as fluorinated polyamic acid, fluorinated polyimide, fluorinated polyamide-imide, fluorinated epoxy resins, and fluorine resins.

In particular, polyamic acid (including fluorinated polyamic acid), polyimide (including fluorinated polyimide), and polyamide-imide (including fluorinated polyamide-imide) are practically useful.

The polyamic acid can be obtained, for example, by allowing an organic tetracarboxylic acid dianhydride and a diamine to react.

The organic tetracarboxylic acid dianhydride includes pyromellitic dianhydride, 3,3',4,4'-biphenyltetracarboxylic acid dianhydride, 2,2-bis(2,3-dicarboxyphenyl)propane dianhydride, 2,2-bis(3,4-dicarboxyphenyl)propane dianhydride, 3,3',4,4'-benzophenonetetracarboxylic acid dianhydride, bis(3,4-dicarboxyphenyl) ether dianhydride, and bis(3,4-dicarboxyphenyl)sulfonic acid dianhydride. Also included are halogen-substituted (e.g., fluorine-substituted) tetracarboxylic acid dianhydrides, such as 2,2-bis(2,3-dicarboxyphenyl)hexafluoropropane dianhydride, 2,2-bis(3,4-dicarboxyphenyl)hexafluoropropane dianhydride, 4,4-bis(3,4-dicarboxytrifluorophenoxy)tetrafluorobenzene dianhydride, 1,4-bis(3,4-dicarboxytrifluorophenoxy)tetrafluorobenzene dianhydride, (trifluoromethyl)pyromellitic dianhydride, di(trifluoromethyl)pyromellitic dianhydride, and di(heptafluoropropyl)pyromellitic dianhydride.

These organic tetracarboxylic acid dianhydrides can be used either singly or as a mixture of two or more thereof. Of the organic tetracarboxylic acid dianhydrides preferred are the halogen-substituted tetracarboxylic acid dianhydrides.

The diamines include m-phenylenediamine, p-phenylenediamine, 3,4'-diaminodiphenyl ether, 4,4'-diaminodiphenyl ether, 4,4'-diaminodiphenyl sulfone, 3,3'-diaminodiphenyl sulfone, 2,2-bis(4-amiophenoxyphenyl)propane, 1,3-bis(4-aminophenoxy)benzene, 1,4-bis(4-aminophenoxy)benzene, 2,4-diaminotoluene, 2,6-diaminotoluene, 4,4'-diaminodiphenylmethane, and 4,4'-diamino-2,2'-dimethylbiphenyl. Also included are halogen-substituted (e.g., fluorine-substituted) diamines, such as 2,2'-bis(trifluoromethoxy)-4,4'-diaminobiphenyl (TFMOB), 3,3'-diamino-5,5'-bis(trifluoromethyl)biphenyl, 2,2-bis(4-aminophenyl)hexafluoropropane (BAAF), 2,2-bis[4-(4-aminophenoxy)phenyl]hexafluoropropane (HF-BAPP), 2,2'-bis(trifluoromethyl)-4,4'-diaminobiphenyl (TFMB), 2,2-bis(3-amino-4-hydroxyphenyl)hexafluoropropane (BIS-AP-AF), 2,2-bis(3-amino-4-methylphenyl)hexafluoropropane (BIS-AT-AF), 2,2'-difluorobenzidine (FBZ), 4,4'-bis(aminooctafluoro)biphenyl, 3,5-diaminobenzotrifluoride, and 1,3-diamino-2,4,5,6-tetrafluorobenzene.

These diamines can be used either singly or as a mixture of two or more thereof. Preferred of the diamines are halogen-substituted diamines.

The polyamic acid can be obtained by allowing the organic tetracarboxylic acid dianhydride and the diamine to react in a known manner. The reaction is carried out, for example, by stirring the organic tetracarboxylic acid dianhydride and the diamine in an almost equimolar ratio in a reaction solvent in an inert gas atmosphere at 250° C. or a lower temperature, preferably from room temperature (25° C.) to 80° C., for about 5 to 20 hours to obtain a polyamic acid in the form of a viscous solution.

The reaction solvent is not particularly limited as long as it is capable of dissolving both the starting materials (the organic tetracarboxylic acid dianhydride and the diamine) and the resulting polyamic acid. Suitable solvents include polar solvents, such as N-methyl-2-pyrrolidone, N,N-dimethylacetamide, N,N-diethylacetamide, and dimethyl sulfoxide. The polar solvents can be used either singly or as a mixture of two or more thereof. Of the recited polar solvents preferred is N,N-dimethylacetamide for its satisfactory resistance to thermal decomposition and excellent transparency.

The polyamic acid thus obtained typically has a weight average molecular weight of about 5,000 to 500,000, preferably 10,000 to 150,000. The polyamic acid is obtained in the form of a solution of the reaction solvent, accounting for a proportion (solid concentration) of, typically, 1 to 50% by weight, preferably 5 to 30% by weight.

Of the polyamic acids preferred are those comprising a repeating unit represented by formula (II) shown below for their low refractive index, which favors to control of a refractive index difference between a core and a clad in the optical waveguide formation described below.

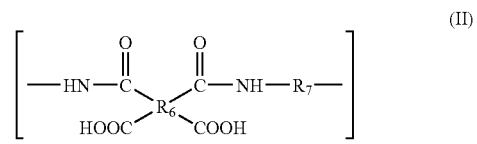

(II)

wherein $R_6$ represents a tetravalent organic group selected from groups (2a), (2b), (2c), and (2d) shown below; and $R_7$ represents a divalent organic group selected from the groups (2e), (2f), (2g), and (2g) shown below.

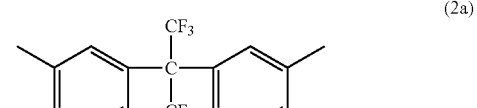

(2a)

(2b)

(2c)

(2d)

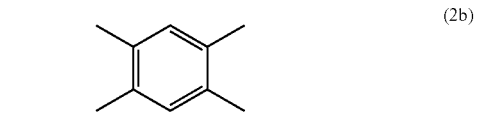

(2e)

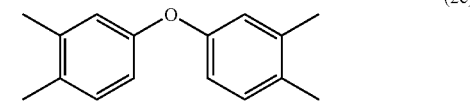

(2f)

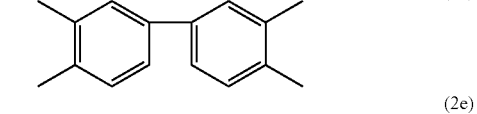

(2g)

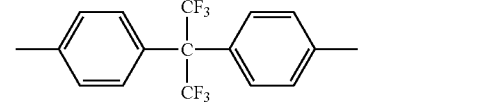

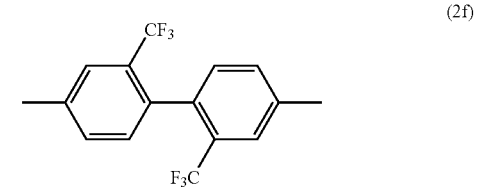

(2h)

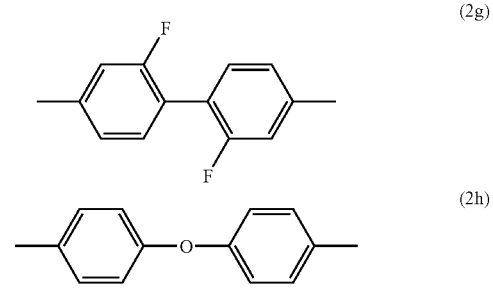

Polyamic acids containing a halogen atom (e.g., fluorine) in the molecule thereof which are prepared using the halogen-substituted (e.g., fluorine-substituted) tetracarboxylic acid dianhydride and/or the halogen-substituted (e.g., fluorine-substituted) diamine exhibit improved transparency compared with halogen-free polyamic acids and therefore reduce the requisite amount of the 1,4-dihydropyridine derivative to be compounded therewith. In addition, the resin composition comprising the halogen-containing polyamic acid as a matrix resin has sufficient sensitivity even at a reduced irradiation dose to produce a sufficient contrast in refractive index.

The polyimide, another example of the matrix resin, can be obtained, for example, by imidizing the above-described polyamic acid in a conventional manner. The polyamide-imide, a still other example of the matrix resin, can be obtained by partially imidizing the polyamic acid in a conventional manner. Of the polyimide and the polyamide-imide resins those containing a halogen atom (e.g., fluorine) in their molecule have the same advantages as with the halogen-containing polyamic acid. That is, the amount of the 1,4-dihydropyridine derivative to be compounded can be reduced, and the resin composition exhibits sufficient sensitivity even at a reduced irradiation dose to produce a sufficient contrast in refractive index.

The resin composition for optical connection is prepared by compounding the 1,4-dihydropyridine derivative into the matrix resin. The amount of the 1,4-dihydropyridine derivative to be compounded is usually 0.1 to 30 parts by weight, preferably 1 to 5 parts by weight, per 100 parts by weight of the resin. With a 1,4-dihydropyridine derivative content of less than 0.1 part, the resin composition can fail to produce a sufficient difference in refractive index between irradiated and non-irradiated parts for forming an optical waveguide. If the 1,4-dihydropyridine derivative content exceeds 30 parts by weight, the composition tends to have an increased absorption in the near infrared region.

The manner of compounding the 1,4-dihydropyridine derivative into the resin is not particularly restricted. For example, the 1,4-dihydropyridine derivative and the resin are mixed by stirring in an organic solvent capable of dissolving them. When a resin preliminary prepared in the form of a solution (such as the above-described polyamic acid solution) is used, the 1,4-dihydropyridine derivative can be added into the resin solution at a predetermined proportion as described above, followed by mixing.

Where the resin composition is prepared as a solution, it is preferred to adjust the solution viscosity to, e.g., about 2 to 50 Pa·s, preferably about 5 to 20 Pa·s.

In the first step of the process according to the invention, the resulting resin composition for optical connection is disposed between optical devices to be connected.

The optical devices which can be connected by the technique of the present invention include, but are not limited to, optical fibers (single-mode optical fibers and multi-mode optical fibers), optical waveguides, light-emitting devices, e.g., laser diodes, and light-receiving devices, e.g., photodiodes.

Figure 1B:
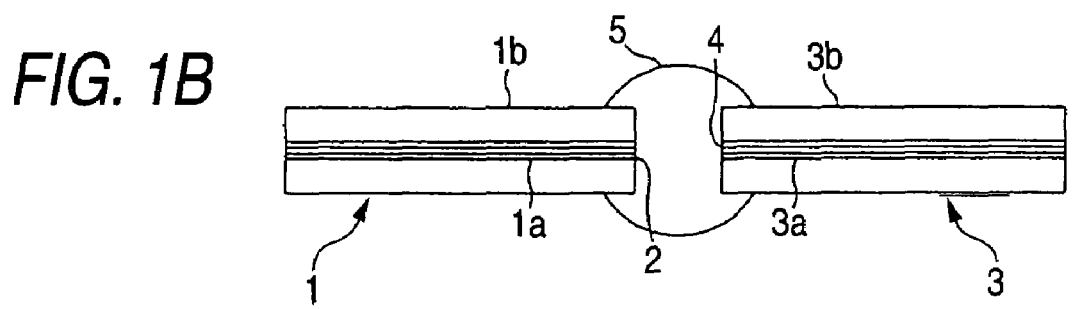

The manner of disposing the resin composition between optical devices is not particularly restricted. For example, as shown in FIG. 1A, a first optical device 1 and a second optical device 3 which are to be optically connected are placed with a certain spacing with the input or output end 2 of the former and the input or output end 4 of the latter facing to each other. Then, as shown in FIG. 1B, the resin composition 5 is disposed between the input or output end 2 of the first optical device 1 and the input or output end 4 of the second optical device 3.

The first and the second optical devices 1 and 3 used in the embodiment shown in FIG. 1 are optical fibers. The first optical device 1 is composed of a columnar, high-refractive core 1a and a cylindrical, low-refractive clad 1b covering the whole circumference of the core 1a. The input or output end 2 corresponds to the input or output end of the core 1a. Similarly, the second optical device 3 is composed of a columnar, high-refractive core 3a and a cylindrical, low-refractive clad 3b covering the whole circumference of the core 3a. The input or output end 4 corresponds to the input or output end of the core 3a.

The first optical device 1 and the second optical device 3 can be aligned with their input or output ends facing each other by means of an active alignment system based on light injection and detection. From economical considerations, alignment by image processing and V-groove alignment using a V-grooved substrate as an alignment aid, which is used for aligning optical fibers, etc., are preferably used.

Figure 2A:
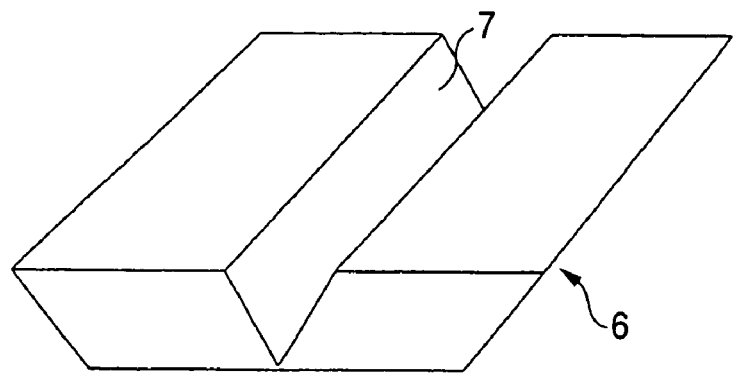
Figure 2B:
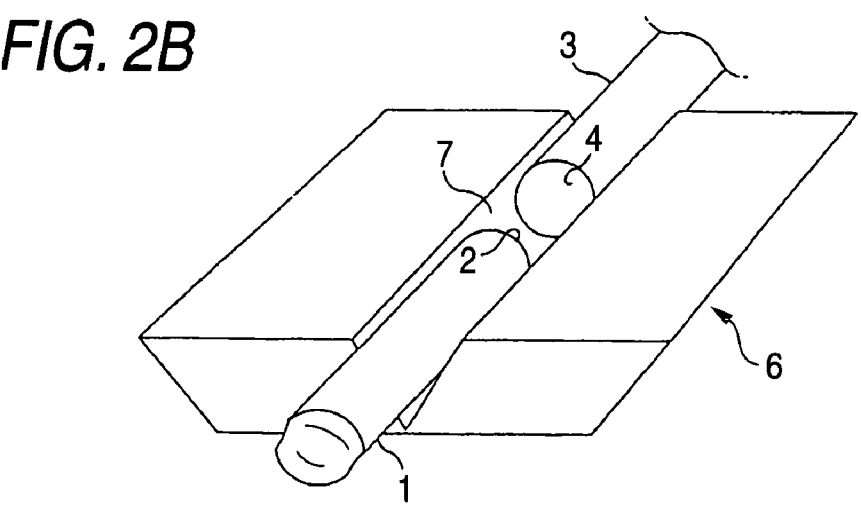

As shown in FIG. 2A, alignment using a V-grooved substrate starts with preparation of a V-grooved substrate 6 made of synthetic silica, etc. having a V-groove 7 in the direction of aligning the first optical device 1 and the second optical device 3 (longitudinal direction). The first and the second optical devices 1 and 3 are laid in the V-groove 7 with a predetermined spacing therebetween with their input or output ends facing each other as shown in FIG. 2B. Like this, optical devices to be connected can be aligned reliably with the aid of the V-grooved substrate 6 having a simple structure.

The distance (spacing) between the input or output end 2 of the first optical device 1 and the input or output end 4 of the second optical device 3 is not particularly limited as far as light emitted from either end is transmitted through the resin composition 5 and made incident on the other. The distance is usually 30 mm or shorter, preferably 1 mm or shorter, still preferably 100 μm or shorter. At a distance longer than 30 mm, the loss of light transmitted through the resin composition 5 can be so large that the light emitted from one end may not be sufficiently inputted into the other.

The way of disposing the resin composition 5 in the space between the first and the second optical devices 1 and 3 is not particularly restricted. For example, in using a solid resin composition, it is dabbed into the space. In using a solution form, the solution is dropped into the gap. In either case, it is preferred that the gap between the two optical devices be completely filled up.

Figure 2C:
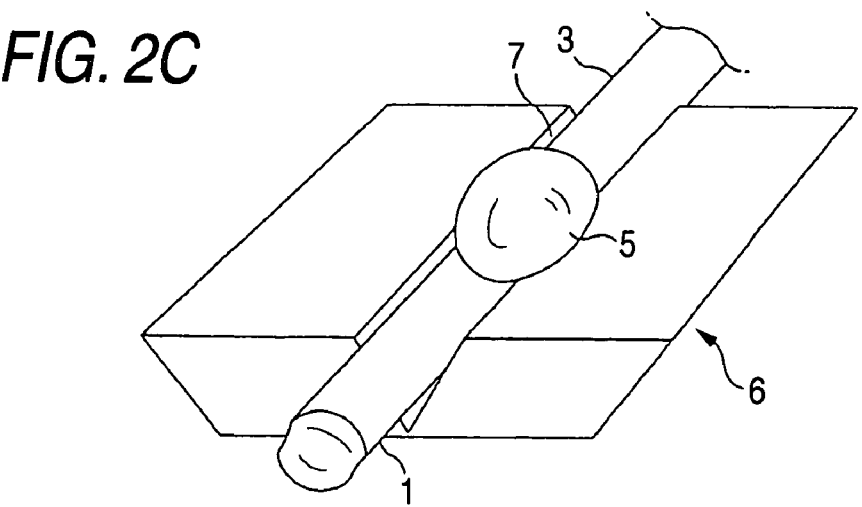

FIG. 2C represents an example of the resin composition 5 in solution form having been dropped in the gap between the first and the second optical devices 1 and 3 aligned in the groove 7 of the V-grooved substrate 6.

In the second step of the process, light having a wavelength causing the 1,4-dihydropyridine derivative to change its structure is transmitted through the resin composition to form an optical path between the optical devices.

Light for optical path formation is not particularly limited as long as the wavelength is such that the 1,4-dihydropyridine derivative undergoes structure change upon being irradiated. Various lasers can be used as a light source. The laser to be used is chosen according to the structure of the 1,4-dihydropyridine derivative. Where, for example, the 1,4-dihydropyridine derivative is 1-ethyl-3,5-dimethoxycarbonyl-4-(2-nitrophenyl)-1,4-dihydropyridine, 2,6-dimethyl-3,5-dimethoxycarbonyl-4-(2-nitrophenyl)-1,4-dihydropyridine, etc., which undergoes structural change on absorbing light having wavelengths at about 300 to 500 nm, a laser emitting light of a wavelength in that range, such as an He—Cd laser or an Ar laser, is employed.

In addition to laser light, light emitted from a high-pressure mercury lamp, etc. for general exposure and condensed is also useful.

Figure 1C:
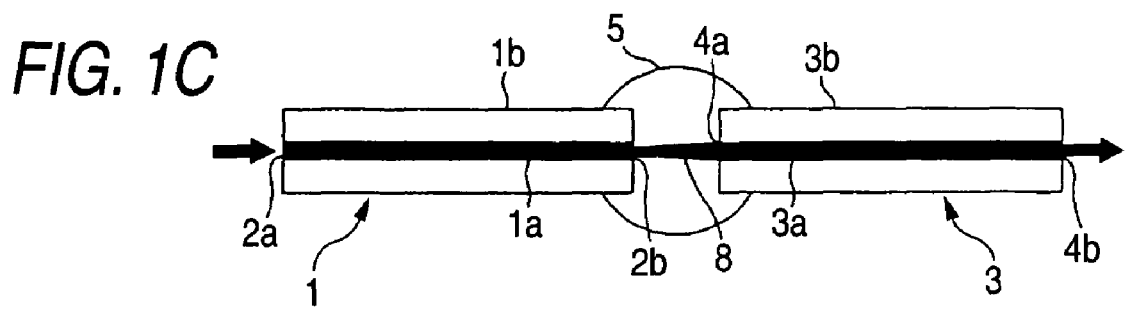

As shown in FIG. 1C, light is led into the input end 2a (reference character "a" will hereinafter be used for an input end, and "b" for an output end) of the first optical device 1 and transmitted through the first optical device 1. The light emitted from the output end 2b of the first optical device 1 is transmitted through the resin composition 5, made incident on the input end 4a of the second optical device 3, transmitted through the second optical device 3, and emitted from the output end 4 of the second optical device 3.

Figure 3A:
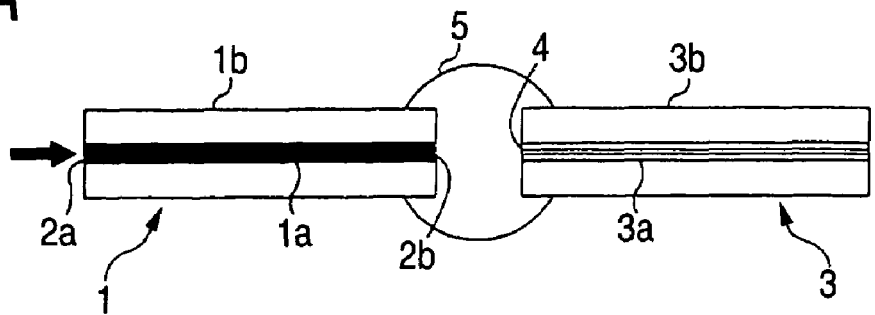
Figure 3B:
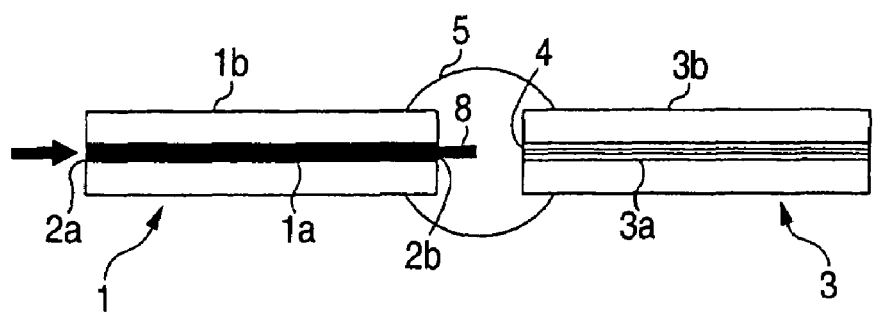
Figure 3C:
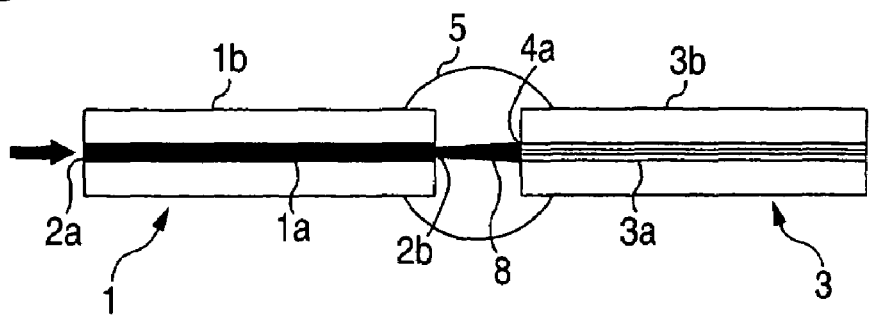

The light emitted from the output end 2b of the first optical device 1 (see FIG. 3A) propagates in the resin composition 5 without scattering (see FIG. 3B) and reaches the input end 4a of the second optical device 3 (see FIG. 3C) to form an optical path 8.

The 1,4-dihydropyridine derivative in the part where light has passed to form an optical path 8 undergoes structural change into a substance that is hardly removed in the subsequent step of removal described below.

The structural change the 1,4-dihydropyridine derivative undergoes upon irradiation variously depends on the structure of the compound. However, release of hydrogen from the 1- and 4-positions to convert the pyridine ring to a Kekule structure can be mentioned as an example of the structural change.

Figure 4A:
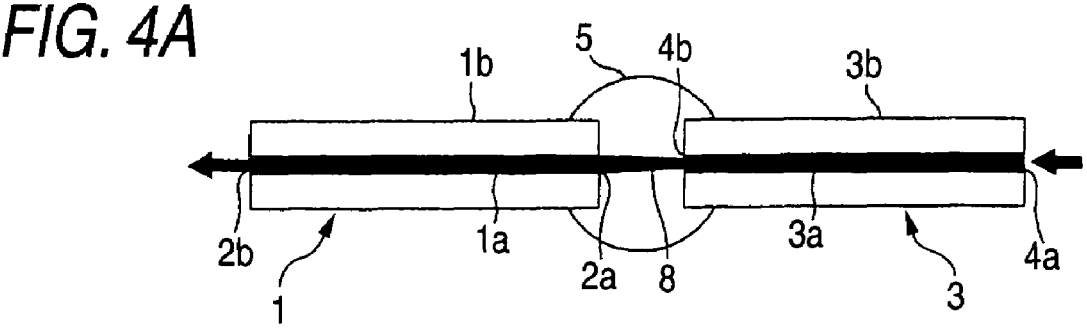
Figure 4B:
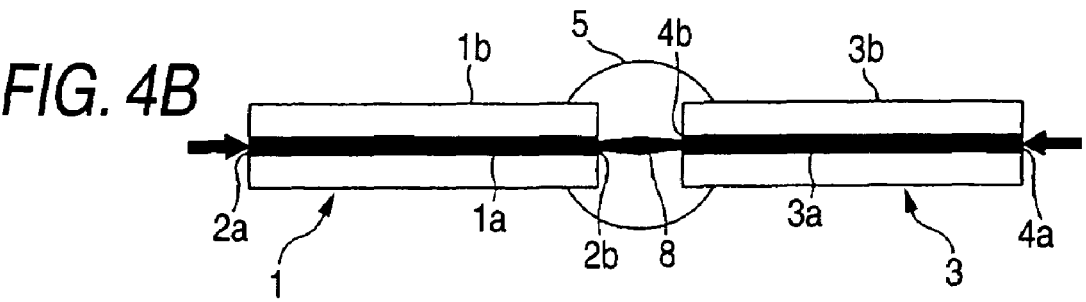

The light propagation direction in optical path formation is not limited to that of the embodiment shown in FIG. 1C. The light direction may be reversed as shown in FIG. 4A, in which light emitted from the output end 4b of the second optical device 3 is transmitted through the resin composition 5, and made incident on the input end 2a of the first optical device 1. It is also effective to guide light in two directions as shown in FIG. 4B, in which light is led into each of the input end 2a of the first optical device 1 and the input end 4a of the second optical device 3, transmitted through the first and the second optical devices 1 and 3, emitted from the output end 2b of the first optical device 1 and the output end 4b of the second optical device 3, respectively, and transmitted through the resin composition 5. This bidirectional optical path formation is advantageous in capable of forming a longer optical path 8 between the optical devices.

Figure 4C:
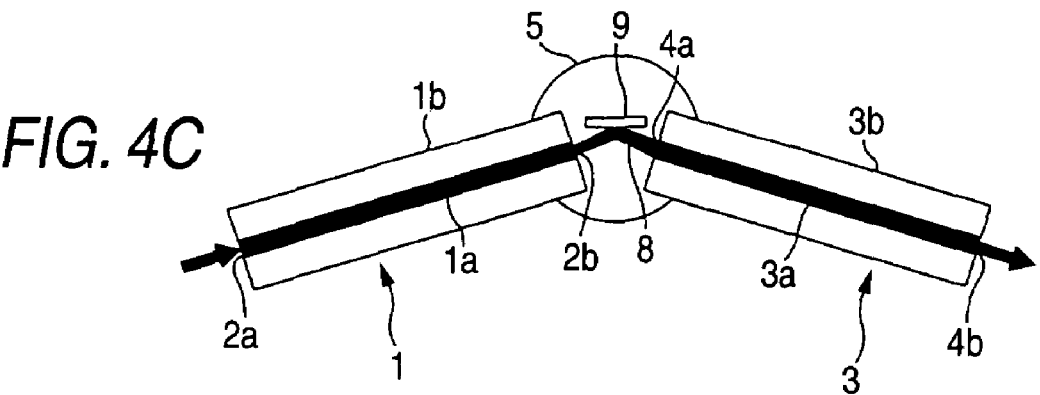
Figure 4D:
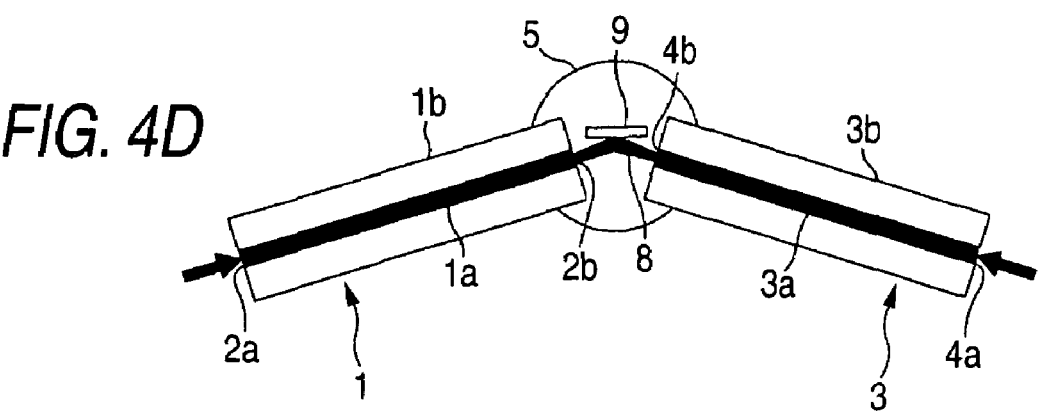

In the embodiments shown in FIGS. 1C, 4A, and 4B, the optical devices are aligned on the same axis to form a straight optical path 8. Otherwise, it is possible to form a bent optical path as illustrated in FIGS. 4C and 4D. In the embodiments shown in FIGS. 4C and 4D, the first optical device 1 and the second optical device 3 are laid with their axes making a prescribed angle, a mirror 9 is set near the intersection of the axes, and the resin composition 5 is disposed in the spacing between the first and the second optical devices 1 and 3 while embracing the mirror 9 therein. In the embodiment of FIG. 4C, light emitted from the output end 2b of the first optical device 1 is reflected on the mirror 9 in the resin composition 5 and guided into the input end 4a of the second optical device 3 to form a bent optical path 8. In the embodiment of FIG. 4D, light is emitted from each of the output end 2b of the first optical device 1 and the output end 4b of the second optical device 3 in the same manner as in FIG. 4B and reflected on the mirror 9 to form a bent optical path 8. According to these embodiments, the optical devices can be optically connected even when some restriction of layout design, etc. does not allow formation of a straight optical path.

While not shown in the drawings, three or more optical devices can be connected by forming an optical path 8 in every adjacent optical devices in the same manner as described above.

The irradiation dose to be applied is decided appropriately according to the kinds and amounts of the 1,4-dihydropyridine derivative and the resin, the wavelength of light, and the distance between the optical devices to be connected, and the like.

In the third step of the process, the 1,4-dihydropyridine derivative is removed from the resin composition.

The 1,4-dihydropyridine derivative does not always need to be removed completely. It suffices that the 1,4-dihydropyridine derivative is removed to such a degree as to result in a sufficient difference in refractive index between the irradiated and the non-irradiated parts of the resin composition for forming an optical waveguide.

The method of removing the 1,4-dihydropyridine derivative includes, but is not limited to, (a) extraction and (b) heating.

Removal by extraction is carried out, for example, by using an organic solvent capable of dissolving the 1,4-dihydropyridine derivative in accordance with general procedures of solvent extraction. Supercritical extraction using a supercritical fluid such as carbon dioxide is also effective.

By extraction, the 1,4-dihydropyridine derivative that has not undergone structural change is extracted from the non-irradiated part of the resin composition, while the 1,4-dihydropyridine derivative that has undergone structural change remains in the irradiated part of the resin composition.

Removal by heating is carried out by heating the resin composition at, e.g., 150° to 250° C., preferably 170° to 240° C.

By heating, the 1,4-dihydropyridine derivative that has not undergone structural change vaporizes off the non-irradiated part of the resin composition, while the 1,4-dihydropyridine derivative that has undergone structural change remains in the irradiated part of the resin composition.

Figure 1D:
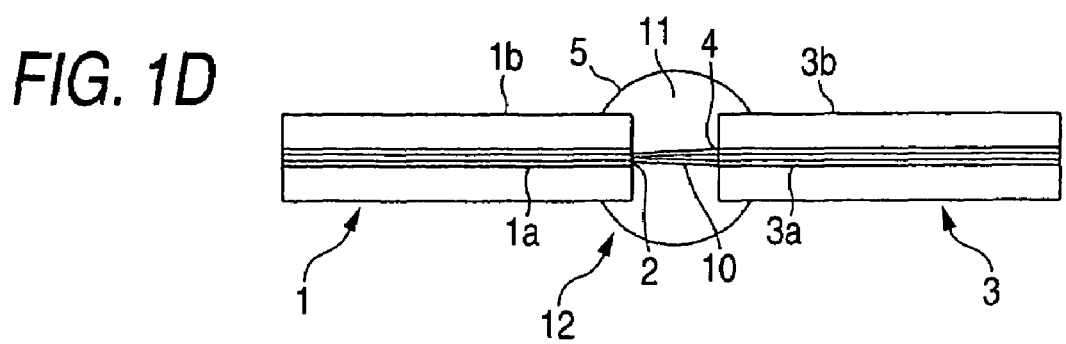

It follows that the concentration of the 1,4-dihydropyridine derivative that has undergone structural change and remains in the optical path (i.e., the irradiated part) becomes higher than that of the 1,4-dihydropyridine derivative that has undergone no structural change in the other part (i.e., the non-irradiated part). As a result, the optical path exhibits a higher refractive index than the other part of the resin composition. As illustrated in FIG. 1D, there is thus formed an optical waveguide 12 composed of the part having formed the optical path 8 and functioning as a core 10 with a higher refractive index and the other part serving as a clad 11 with a lower refractive index, whereby the first optical device 1 and the second optical device 3 are connected optically.

The difference in refractive index between the core 10 and the clad 11 of the optical waveguide 12, for example, where the optical waveguide 12 is formed as single mode, the refractive index of a core is designated as n1, and the refractive index of a clad is designated as n2, is expressed in terms of a relative refractive index difference $\Delta$ (%) represented by equation: $\Delta=(n1-n2)/n1\times 100$. The relative refractive index difference $\Delta$ preferably ranges from 0.2 to 0.5%.

Where the 1,4-dihydropyridine derivative is to be removed by heating the resin composition that has been disposed in solution form, it is preferable to preheat the resin composition to, e.g., about 80° to 120° C. to preliminarily remove the organic solvent of the solution.

Where the resin composition containing a polyamic acid as a matrix resin is heated to remove the 1,4-dihydropyridine derivative, the polyamic acid may be imidized by the heating simultaneously with removing the 1,4-dihydropyridine derivative thereby to impart improved heat resistance to the optical waveguide 12. When heating is at a temperature in the above-recited range of 150° to 250° C., the polar solvent of the polyamic acid solution vaporizes and, at the same time, most of the polyamic acid is imidized to bring about improved heat resistance. Further heating at 300° to 400° C. results in complete imidization of the polyamic acid to further improve the heat resistance.

According to the process of the present invention, an optical waveguide can be formed between a plurality of optical devices by simply disposing a resin composition prepared from a 1,4-dihydropyridine derivative and a resin between the optical devices to be connected, forming an optical path through the resin composition, and removing the 1,4-dihydropyridine derivative, to thereby optically connect the optical devices.

In short, the process of the invention requires strict selection of the formulation for self-forming an optical waveguide. What is required is to prepare a resin composition from a 1,4-dihydropyridine derivative and a matrix resin. Simply by removing the 1,4-dihydropyridine derivative from the resin composition, a refractive index difference is easily produced between the irradiated part (an optical path) and the non-irradiated part to form a reliable optical waveguide. Reliable optical connection of optical devices can be achieved with a simpler formulation through a reduced number of steps without involving development processing. Thus, the optical connection structure of the present invention is inexpensive, easy to make, and reliable.

The waveguide manufacturing process of the invention is applicable to optical connection of a wide variety of optical devices with no particular restriction. The optical waveguides which can be formed by the process include straight waveguides, bent waveguides, and intersecting waveguides.

The optical devices to which the connection structure of the invention include wavelength filters, optical switches, optical branching parts, optical combining parts, optical branching/combining parts, optical amplifiers, wavelength converters, wavelength dividers, beam splitters, directional couplers, and hybrid optical transmission modules having a laser diode or a photodiode.

EXAMPLES

The present invention will be illustrated in greater detail with reference to the following Examples, but the invention should not be construed as being limited thereto.

Example 1

1) Preparation of Resin Composition

In a 500 ml separable flask were put 16.0 g (0.05 mol) of 2,2'-bis(trifluoromethyl)-4,4'-diaminobiphenyl and 152.8 g of N,N-dimethylacetamide in a nitrogen atmosphere to prepare a solution.

To the solution was added 22.2 g (0.05 mol) of 2,2-bis(3,4-dicarboxyphenyl)hexafluoropropane dianhydride while stirring, and the mixture was stirred at room temperature for 24 hours to prepare a polyamic acid solution.

To the polyamic acid solution was added 1.91 g of 1-ethyl-3,5-dimethoxycarbonyl-4-(2-nitrophenyl)-1,4-dihydropyridine (corresponding to 5 parts per 100 parts of the polyamic acid on a solid basis) to prepare a resin composition in solution form.

2) Connection of Optical Fibers

A V-grooved substrate of synthetic silica shown in FIG. 2 (groove depth: 20 mm; groove angle: 60°) was prepared. A single-mode glass fiber having an outer diameter of 125 μm (core diameter: 9.5 μm) and a multi-mode glass fiber (core diameter: 50.0 μm) were aligned in the V-groove at a distance of 100 μm, 500 μm, 1000 μm, and 1500 μm. The gap between the optical fibers was filled with the resin composition prepared above by dropping.

The resin composition was preliminarily dried at 100° C. for 20 minutes. Laser light (wavelength: about 490 nm) condensed through a condensing lens was made incident on the single-mode glass fiber, transmitted through the resin composition, and emitted from the multi-mode glass fiber for 5 minutes.

The facing ends of the two glass fibers were observed under a stereomicroscope during laser light irradiation. It was found that a blue straight beam was emitted from the output end of the single-mode glass fiber, transmitted through the resin composition without diffusing, and guided into the input end of the multi-mode glass fiber.

The resin composition was heated at 180° C. for 10 minutes to remove the residual organic solvent and the 1,4-dihydropyridine derivative from the resin composition and to imidize the polyamic acid. A stereomicroscopic observation of the facing ends of the glass fibers during heating provided confirmation that the part where laser light had passed (where an optical path had been formed) slightly turned yellow, which indicated core formation.

The resin composition was further heated in vacuo at 300° C. for 1 hour to complete imidization of the polyamic acid.

3) Evaluation

Figure 5:
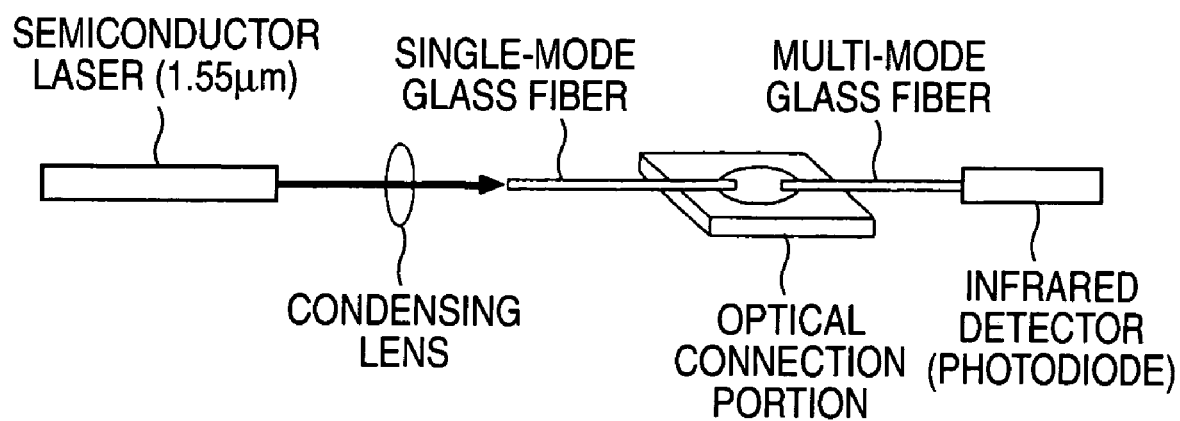
FIG. 5 schematically illustrates an apparatus for measuring a connection loss through an optical connection structure obtained in the Examples and Comparative Examples.

The connection loss of the resulting connection structure was measured using a semiconductor laser. As shown in FIG. 5, laser light emitted from a semiconductor (wavelength: 1.55 μm (5 mW)) was passed through a condensing lens, led into the single-mode glass fiber, transmitted through the optical connection made by the resin composition, and emitted from the multi-mode glass fiber. The emitted light was detected with an infrared detector (photodiode) to obtain the optical loss. The results are shown below.

| Distance between Glass Fibers | Connection Loss |
| --- | --- |
| 100 μm | 0.2 dB |
| 500 μm | 0.4 dB |
| 1000 μm | 0.9 dB |
| 1500 μm | 1.4 dB |

Comparative Example 1

Glass fibers were optically connected in the same manner as in Example 1, except that 1-ethyl-3,5-dimethoxycarbonyl-4-(2-nitrophenyl)-1,4-dihydropyridine was not added to the resin solution. The optical losses determined in the same manner as in Example 1 are shown below.

| Distance between Glass Fibers | Connection Loss |
| --- | --- |
| 100 μm | 1.2 dB |
| 500 μm | 2.2 dB |
| 1000 μm | 5.7 dB |
| 1500 μm | 9.8 dB |

Comparative Example 2

The same glass fibers as used in Example 1 were not optically connected with a resin composition. The optical losses due to the air gap between the glass fibers were as follows.

| Distance between Glass Fibers | Connection Loss |
| --- | --- |
| 100 μm | 2.3 dB |
| 500 μm | 9.5 dB |
| 1000 μm | 18.0 dB |
| 1500 μm | >20.0 dB (unmeasurable) |

Example 2

1) Preparation of Resin Composition

In a 500 ml separable flask were put 16.0 g (0.05 mol) of 2,2'-bis(trifluoromethyl)-4,4'-diaminobiphenyl and 152.8 g of N,N-dimethylacetamide in a nitrogen atmosphere to prepare a solution. To the solution was added 22.2 g (0.05 mol) of 2,2-bis(3,4-dicarboxyphenyl)hexafluoropropane dianhydride while stirring, and the mixture was stirred at room temperature for 24 hours to prepare a polyamic acid solution.

The polyamic acid solution was diluted with N,N-dimethylacetamide to have a solid content of 10%. To the diluted solution were added 1.2 equivalent of pyridine per carboxylic acid equivalent of the polyamic acid and acetic anhydride to chemically imidize the polyamic acid. The precipitated polyimide was washed successively with large quantities of water and isopropyl alcohol, collected by filtration, and dried at 65° C. under reduced pressure to obtain white flaky polyimide.

The resulting polyimide was dissolved in N,N-dimethylacetamide to a concentration of 20%. To the solution was added 5 parts of 1-ethyl-3,5-dimethoxycarbonyl-4-(2-nitrophenyl)-1,4-dihydropyridine per 100 parts of the polyamic acid on a solid basis to prepare a resin composition in solution form.

2) Connection of Optical Fibers

A V-grooved substrate of synthetic silica shown in FIG. 2 (groove depth: 20 mm; groove angle: 60°) was prepared. A single-mode glass fiber having an outer diameter of 125 μm (core diameter: 9.5 μm) and a multi-mode glass fiber (core diameter: 50.0 μm) were aligned in the V-groove at a distance of 100 μm, 500 μm, 1000 μm, and 1500 μm. The gap between the optical fibers was filled with the resin composition prepared above by dropping.

The resin composition was preliminarily dried at 100° C. for 20 minutes. Laser light (wavelength: about 490 nm) condensed through a condensing lens was made incident on the single-mode glass fiber, transmitted through the resin composition, and emitted from the multi-mode glass fiber for 5 minutes.

The facing ends of the two glass fibers were observed under a stereomicroscope during laser light irradiation. It was found that a blue straight beam was emitted from the output end of the single-mode glass fiber, transmitted through the resin composition without diffusing, and guided into the input end of the multi-mode glass fiber.

The resin composition was heated at 180° C. for 10 minutes and then in vacuo at 220° C. for 1 hour to remove the residual organic solvent and the 1,4-dihydropyridine derivative from the resin composition.

3) Evaluation

The connection loss of the resulting connection structure was measured in the same manner as in Example 1. The results obtained are shown below.

| Distance between Glass Fibers | Connection Loss |
| --- | --- |
| 100 μm | 0.4 dB |
| 500 μm | 0.7 dB |
| 1000 μm | 1.2 dB |
| 1500 μm | 2.0 dB |

Example 3

Two multi-mode glass fibers were optically connected in the same manner as in Example 1. The optical losses measured in the same manner as in Example 1 were as follows.

| Distance between Glass Fibers | Connection Loss |
| --- | --- |
| 100 μm | 0.3 dB |
| 500 μm | 0.5 dB |
| 1000 μm | 1.1 dB |
| 1500 μm | 1.7 dB |

Example 4

Two glass fibers were optically connected in the same manner as in Example 1, except that the resin composition was prepared by adding 10 parts of 1-ethyl-3,5-dimethoxycarbonyl-4-(2-nitrophenyl)-1,4-dihydropyridine per 100 parts of the polyamic acid on a solid basis. The optical losses were as follows.

| Distance between Glass Fibers | Connection Loss |
| --- | --- |
| 100 μm | 0.3 dB |
| 500 μm | 0.4 dB |
| 1000 μm | 1.2 dB |
| 1500 μm | 1.9 dB |

Example 5

Two glass fibers were optically connected in the same manner as in Example 1, except for aligning two single-mode glass fibers and changing the fiber-to-fiber distance to 10 μm, 30 m, and 50 μm. The optical losses of the resulting optical connections were as follows.

| Distance between Glass Fibers | Connection Loss |
| --- | --- |
| 10 μm | 0.4 dB |
| 30 μm | 0.5 dB |
| 50 μm | 0.8 dB |

Comparative Example 3

Glass fibers were optically connected in the same manner as in Example 5, except that 1-ethyl-3,5-dimethoxycarbonyl- 4-(2-nitrophenyl)-1,4-dihydropyridine was not added to the resin solution. The optical losses were as follows.

| Distance between Glass Fibers | Connection Loss |
|---|---|
| 10 μm | 1.3 dB |
| 30 μm | 2.5 dB |
| 50 μm | 5.8 dB |

Example 6

Glass fibers were optically connected in the same manner as in Example 1, except for replacing the 1-ethyl-3,5-dimethoxycarbonyl-4-(2-nitrophenyl)-1,4-dihydropyridine with 2,6-dimethyl-3,5-dimethoxycarbonyl-4-(2-nitrophenyl)-1,4-dihydropyridine. The optical losses due to the optical connection were as follows.

| Distance between Glass Fibers | Connection Loss |
|---|---|
| 100 μm | 0.2 dB |
| 500 μm | 0.4 dB |
| 1000 μm | 0.8 dB |
| 1500 μm | 1.5 dB |

Example 7

In a 500 ml separable flask were put 10.0 g (0.05 mol) of 4,4'-oxydianiline and 118.5 g of N,N-dimethylacetamide in a nitrogen atmosphere to prepare a solution. To the solution was added 10.9 g (0.05 mol) of pyromellitic dianhydride wile stirring, and the mixture was stirred at room temperature for 24 hours to prepare a polyamic acid solution.

To the polyamic acid solution was added 2.09 g of 1-ethyl-3,5-dimethoxycarbonyl-4-(2-nitrophenyl)-1,4-dihydropyridine (corresponding to 10 parts per 100 parts of the polyamic acid on a solid basis) to prepare a resin composition in solution form.

Glass fibers were optically connected using the resulting resin composition in the same manner as in Example 1. The optical losses as measured in the same manner as in Example 1 were as follows.

| Distance between Glass Fibers | Connection Loss |
|---|---|
| 100 μm | 0.3 dB |
| 500 μm | 0.5 dB |
| 1000 μm | 1.2 dB |
| 1500 μm | 1.7 dB |

Example 8

Glass fibers were optically connected in the same manner as in Example 1, except for replacing the 1-ethyl-3,5-dimethoxycarbonyl-4-(2-nitrophenyl)-1,4-dihydropyridine with 2,6-dimethyl-3,5-diacetyl-4-(2-nitrophenyl)-1,4-dihydropyridine (acetyl form). The optical losses due to the optical connection were as follows. In this Example, the measurement was also made for the cases where the distance between the glass fibers was 2,000 μm and 3,000 μm.

| Distance between Glass Fibers | Connection Loss |
|---|---|
| 100 μm | 0.2 dB |
| 500 μm | 0.2 dB |
| 1000 μm | 0.5 dB |
| 1500 μm | 0.8 dB |
| 2000 μm | 1.2 dB |
| 3000 μm | 3.0 dB |

Example 9

Glass fibers were optically connected in the same manner as in Example 1, except for replacing the 1-ethyl-3,5-dimethoxycarbonyl-4-(2-nitrophenyl)-1,4-dihydropyridine with 1-ethyl-2,6-dimethyl-3,5-diacetyl-4-(2-nitrophenyl)-1,4-dihydropyridine. The optical losses due to the optical connection were as follows. In this Example, the measurement was also made for the cases where the distance between the glass fibers was 2,000 μm and 3,000 μm.

| Distance between Glass Fibers | Connection Loss |
|---|---|
| 100 μm | 0.2 dB |
| 500 μm | 0.3 dB |
| 1000 μm | 0.7 dB |
| 1500 μm | 1.2 dB |
| 2000 μm | 2.0 dB |
| 3000 μm | 4.5 dB |

According to the process of the invention, there is no need to strictly select the formulation for forming an optical waveguide. What is required is to prepare a resin composition from a 1,4-dihydropyridine derivative and a matrix resin. After optical path formation, a refractive index difference can be easily produced between the irradiated part (an optical path) and the non-irradiated part simply by removing the 1,4-dihydropyridine derivative from the resin composition thereby forming a reliable optical waveguide. Thus, optical connection of optical devices can surely be achieved with a simple formulation through only a few steps. Therefore, the optical device connection structure of the invention is inexpensive, easy to make, and reliable.

While the present invention has been described in detail and with reference to specific embodiments thereof, it will be apparent to one skilled in the art that various changes and modifications can be made therein without departing from the spirit and scope thereof.

This application is based on Japanese Patent Application No. 2003-15533 filed Jan. 24, 2003, the contents thereof being incorporated herein by reference.

What is claimed is:

1. A process of manufacturing an optical waveguide for optically connecting a plurality of optical devices, comprising the steps of:

disposing a resin composition between two or more optical devices, the resin composition comprising a resin and a 1,4-dihydropyridine derivative, wherein the resin comprises at least one member selected from the group consisting of a polyamic acid, a polyimide and a polyamide-imide, forming an optical path through the resin composition between the optical devices by allowing light having a wavelength capable of inducing a structural change in the 1,4-dihydropyridine derivative to pass through the composition for optical connection to thereby form, in the composition for optical connection, an irradiated part containing a 1,4-dihydropyridine derivative that has been exposed and undergone structural change and a non-irradiated part containing a 1,4-dihydropyridine derivative that has not exposed and not undergone structural change, wherein the optical path comprises the irradiated part, and after the optical path formation, removing the 1,4-dihydropyridine derivative that has not undergone structural change from the non-irradiated part while retaining the 1,4-dihydropyridine derivative that has undergone structural change in the irradiated part, thereby making higher a refractive index of the optical path than a refractive index of the other part of the composition for optical connection.

2. The process according to claim 1, wherein the removal of the 1,4-hydropyridine derivative is carried out by heating so that the 1,4-hydropyridine derivative that has not undergone structural change vaporizes off the non-irradiated part of the resin composition.

3. The process according to claim 1 or 2, wherein the resin composition contains 1 to 10 parts by weight of the 1,4-dihydropyridine derivative per 100 parts by weight of the resin.

4. The process according to claim 3, wherein the resin composition contains 1 to 5 parts by weight of the 1,4-dihydropyridine derivative per 100 parts by weight of the resin.

5. The process according to claim 1, wherein the 1,4-dihydropyridine derivative comprises a compound represented by formula (I):

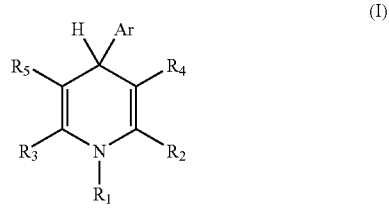

wherein Ar represents an aromatic group having a nitro group at the ortho position with respect to the bond to the 1,4-dihydropyridine ring; $R_1$ represents —H, —$CH_3$, —$(CH_2)_n CH_3$, —$CF_3$, —$(CF_2)_n CF_3$, —$C_6H_5$, —$(CH_2)_n$ $C_6H_5$, —$CH_2CH=CH_2$, —OH, —$OCH_3$, —$O(CH_2)_n$ $CH_3$, —$OCF_3$, —$O(CF_2)_n CF_3$, —$OC_6H_5$, —$O(CH_2)_n$ $C_6H_5$, —COOH, —$COOCH_3$, —COO $(CH_2)_n CH_3$, —$COCH_3$, —$CO(CH_2)_n CH_3$, —$(CH_2)_n$ OH, —$(CH_2)_n$ COOH, —$NO_x$, —F, —Cl, —Br or —I; $R_2$ and $R_3$, which may be the same or different, each represent —H, —$CH_3$, —$(CH_2)_n CH_3$, —$CF_3$, —$(CF_2)_n$ $CF_3$, —OH, —$OCH_3$, —$O(CH_2)_n CH_3$, —$OCF_3$, —$O(CF_2)_n CF_3$, —$COOCH_3$, —$COO(CH_2)_n CH_3$, —$COCH_3$, —$CO(CH_2)_n CH_3$, —$(CH_2)_n OH$, —$(CH_2)_n$ COOH, —$NO_x$, —F, —Cl, —Br or —I; $R_4$ and $R_5$, which may be the same or different, each represent —H, —CN, —$COOR_z$, $COR_z$, or —$CONHR_z$; n represents an integer of 1 to 4; and $R_z$ represents a hydrogen atom or an alkyl group having 1 to 6 carbon atoms.

6. The process according to claim 5, wherein $R_1$ is H, —$CH_3$ or —$(CH_2)_n CH_3$, $R_2$ and $R_3$ each independently represent —H, —$CH_3$ or —$(CH_2)_n CH_3$, $R_4$ and $R_5$ each independently represent —$COOR_z$, or —$COR_z$, wherein $R_z$ is a hydrogen atom or an alkyl group having 1 to 6 carbon atoms and n is an integer of 1 to 4.

7. The process according to claim 5, wherein the 1,4-dihydropyridine derivative comprises at least one compound selected from the group consisting of 1-ethyl-3,5-dimethoxycarbonyl-4-(2-nitrophenyl)-1,4-dihydropyridine, 1-methyl-3,5-dimethoxycarbonyl-4-(2-nitrophenyl)-1,4-dihydropyridine, 1-propyl-3,5-dimethoxycarbonyl-4-(2-nitrophenyl)-1,4-dihydropyridine, 1-propyl-3,5-diethoxycarbonyl-4-(2-nitrophenyl)-1,4-dihydropyridine, 2,6-dimethyl-3,5-dimethoxycarbonyl-4-(2-nitrophenyl)-1,4-dihydropyridine, 2,6-dimethyl-3,5-diacetyl-4-(2-nitrophenyl)-1,4-dihydropyridine, and 1-ethyl-2,6-dimethyl-3,5-diacetyl-4-(2-nitrophenyl)-1,4-dihydropyridine.

8. The process according to claim 7, wherein the 1,4-dihydropyridine derivative comprises 1-ethyl-3,S-dimethoxycarbonyl-4-(2-nitrophenyl)-1,4-dihydropyridine.

9. The process according to claim 7, wherein the 1,4-dihydropyridine derivative comprises at least one of 2,6-dimethyl-3,5-diacetyl-4-(2-nitrophenyl)-1,4-dihydropyridine and 1-ethyl-2,6-dimethyl-3,5-diacetyl-4-(2-nitrophenyl)-1,4-dihydropyridine.

10. The process according to claim 2, wherein the resin is fluorinated.

* * * * *